Feb. 15, 1944.   J. H. COHEN   2,341,529
CHUCK CONSTRUCTION
Filed April 23, 1940
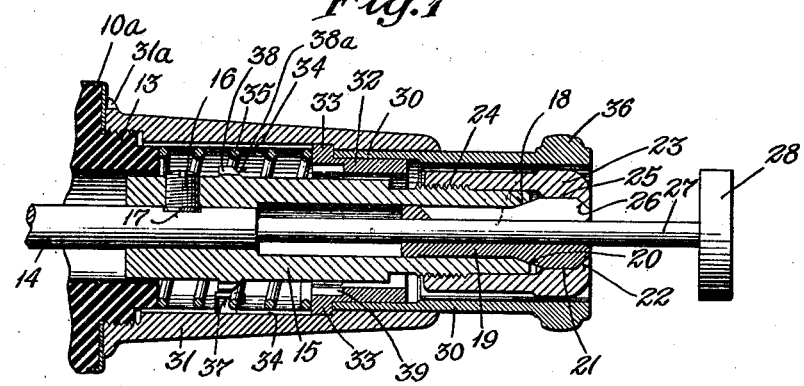
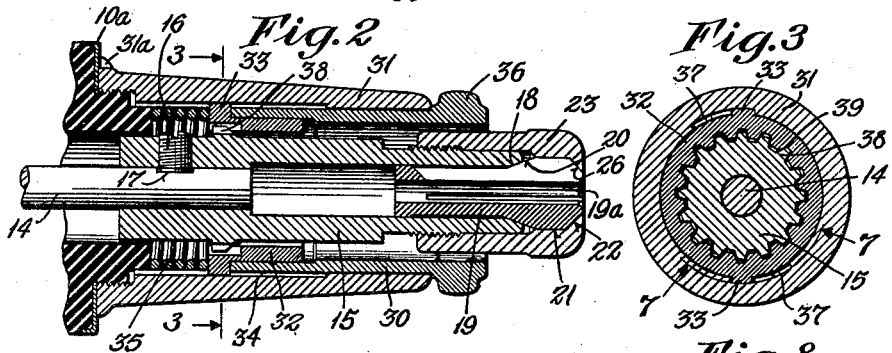
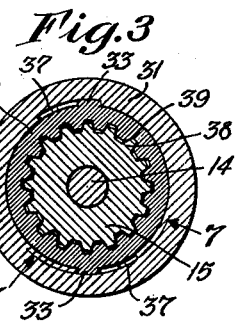
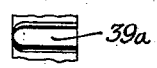
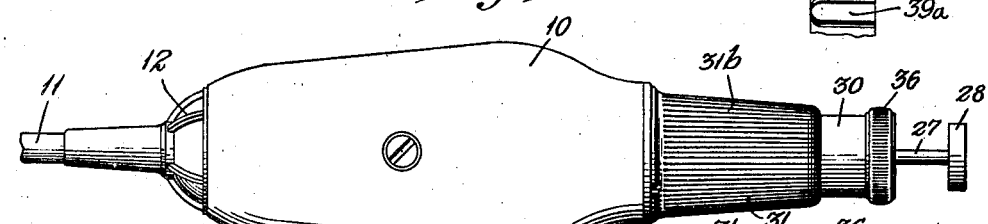
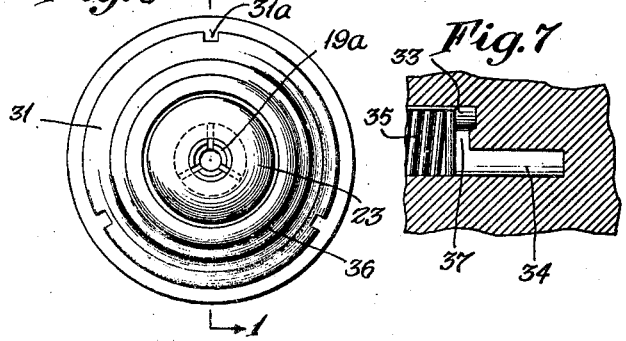
INVENTOR
Joseph H. Cohen
BY
ATTORNEYS Patented Feb. 15, 1944

2,341,529

UNITED STATES PATENT OFFICE 2,341,529

CHUCK CONSTRUCTION

Joseph H. Cohen, Bridgeport, Conn., assignor to Casco Products Corporation, Bridgeport, Conn., a corporation of Connecticut Application April 23, 1940, Serial No. 331,098

12 Claims. (Cl. 279—52)

The present invention relates to chucks, and, more particularly, to chucks for use with portable hand tools.

Heretofore, in hand tools of the present type, it has been difficult to accurately grip the device adjacent the tool so that steady and controlled operation of the tool over the work can be obtained. This occurs due to the fact that the chuck supporting the tool on the drive shaft presented a rotating surface which would interfere with the gripping of the device adjacent the tool.

Furthermore, when the chuck was mounted on a freely rotatable power shaft, such as the armature shaft of an electric motor, difficulty was encountered in holding the shaft against rotation while actuating the chuck-operating means to grip or release the tool.

An object of the present invention is to provide a power-operated hand tool with a means whereby a grip can be had adjacent the tool to insure steady movement of the tool over the work and also to provide a means for locking the power shaft and/or chuck carried thereby to the casing so that operation of the chuck to grip or release the tool will be facilitated.

According to the present invention, this is accomplished by providing the device with a sleeve which is mounted on the casing so as to surround the chuck and provide a hand grip adjacent the tool and at the same time project the user against injury caused by the rapidly rotating chuck. The sleeve is slidably mounted within a housing which is secured to the casing and is normally urged into projected position by a spring mechanism and is held against rotation with respect to the housing by means of a suitable connection therewith.

When access to the chuck is required, as, for example, when it is desired to change the tool, it is necessary merely to force the protecting sleeve backwardly against the action of the spring and thus make the clutch operator available for actuation to release the tool or move the chuck jaws into gripping relation with the tool, as the case may be.

In order to facilitate the operation of releasing or tightening the chuck, the present invention provides means associated with the slidable sleeve for locking the chuck sleeve against relative rotation with respect to the casing when the protection sleeve is moved into the position to uncover the chuck-operating means.

This means preferably comprises a keyway in the housing for the slidable sleeve to receive a key on the sleeve. If desired, the keyway can be provided with lateral openings into which the key carried by the protecting sleeve may be turned to lock it in retracted position. With the sleeve thus locked in retracted position, and in this position locking the clutch against rotation, a greater force can be applied to operate the chuck to cause the jaws thereof to release or grip the toll inserted therein.

Other features and advantages of the invention will be apparent from the specification and claims, when taken in connection with the drawing, in which—

Figure 1 is a longitudinal sectional view, taken along line 1—1 of Fig. 6, with a tool in position therein.

Fig. 2 is a view similar to Figure 1, with the protecting sleeve in retracted position, and the tool omitted.

Fig. 3 is a section taken along line 3—3 of Fig. 2, with the protecting sleeve moved into locked retracted position.

Fig. 4 is a longitudinal side elevational view of the device showing the chuck mounted on the motor casing and the protecting sleeve in position for use.

Fig. 5 is a fragmentary elevational view of the chuck mechanism showing the protecting sleeve moved to retracted position.

Fig. 6 is an end view of the chuck.

Fig. 7 is a sectional view, taken along the line 7—7 of Fig. 3.

Fig. 8 is a detailed view of the tooth on the bushing.

As is shown in the drawing, a casing 10 for the tool encloses a power means. Preferably, the power means comprises an electric motor of the type disclosed in copending application Serial No. 222,123, now Patent No. 2,264,033, issued on November 25, 1941, energized by current supplied by a conductor 11 passing through one end of the casing and controlled by a switch 12. The other end of the casing is provided with a threaded neck portion 13 from which projects a motor shaft 14.

According to the present invention, a chuck means is secured to the end of the motor shaft. As illustrated, the chuck comprises a sleeve 15 having one end thereof slipped over the end of the drive shaft 14 and locked in place thereon for rotation therewith by means of a set screw 16 threaded into engagement with a flat portion 17 on the motor shaft.

The bore at the other end of the sleeve is provided with a tapered camming surface 18. A tubular gripping element 19 is slidably disposed in the end of the chuck sleeve and has a plurality of slits therein extending from the outer end thereof for substantially the full length to provide a plurality of gripping jaws 19a, as shown in Fig. 6.

The gripping jaws are provided on their outer surface adjacent the end of the element with a camming surface 20 to engage the camming surface 18 of the chuck sleeve. The camming surface 20 merges into an enlarged cylindrical surface 21. At the extreme end of the element 19, a further tapered surface 22 is provided to engage an operating member 23 for causing the gripping jaws to be moved into and out of gripping relation.

As shown in Figs. 1 and 2, the operating sleeve 23 is mounted on the end of the chuck sleeve and is threaded thereon at 24. The operating sleeve is provided with an internal cylindrical surface 25 cooperating with the cylindrical surface 21 of the gripping element.

The cylindrical surfaces of the operator 23 cooperating with the surfaces 21 of the gripping member retain the gripping members in their proper relation to receive the shank when the operating member is moved to release the grip of the gripping jaws.

The operating member has a cam surface 26 formed at the end which abuts and cooperates with the cam surface 22 on the end of the gripping member.

As the operating sleeve is threaded on the chuck sleeve, it will be drawn therealong and the cam 26 will bear against the cam 22 and force the camming surfaces 20 on the gripping member along the surfaces 18 of the chuck sleeve to cause the gripping elements 19a to be pressed into engagement with the shank 27 of a tool 28 which is inserted therein.

The angle of the camming surfaces 22 and 26 not only moves the gripping member into the chuck sleeve, but also aids in the movement of gripping members 19a into gripping relation with the shank.

It will thus be seen that I have provided a simple but efficient chuck for gripping and supporting a tool.

When the device is especially used on fine work, which requires careful control of the tool, it is desired to grip the device as close to the tool as possible so that the tool can be steadied as it is guided over the work. This, in prior constructions, could not be achieved because of the fact that the chuck for carrying the tool was rotating at a high speed and forced the user of the device to grip the casing beyond the chuck. Oftentimes, too, the hands of the user accidentally engage the chuck rotating at a high speed and caused injury to him.

The present invention has obviated these disadvantages and has provided a novel construction, which, in addition to forming a gripping surface adjacent the tool, also protects the user against injury by the rotating chuck.

This is accomplished by providing a sleeve 30 slidably mounted in a housing 31 threaded to the neck 13 of the casing. Suitable recesses 31a are provided for the reception of a tool by which the housing can be turned into tight engagement with the casing. Inasmuch as the casing in the preferred form of the inventon is of moldable material, a collar or annular member 10a can be positioned around the neck to form an abutment for the housing. At its inner end the protecting sleeve has a bushing 32 connected thereto by a forced fit. The bushing is provided with opposed keys 33 projecting therefrom and operating in slots 34 formed on the inner surface of the housing to normally hold the sleeve against rotation in the housing. As is shown in Figure 1, the sleeve is urged to and held in projected position by means of a spring 35 disposed within the housing and having one end engaging the end of the casing and the other end bearing against the bushing. The sleeve is limited in its outward movement by the keys 33 engaging the ends of the slots 34.

As is shown in Figures 1 and 4, the protecting sleeve, when in projecting position, completely surrounds the chuck so as to protect the user from injury due to the rotating chuck, and, at the same time, provides a smooth surface by which the device can be gripped adjacent the tool to insure steady guiding of the tool over the work. A bead 36 is formed at the end of the sleeve to form an abutment to prevent the hand from slipping from the grip.

When access to the chuck-operating means is necessary, the protecting sleeve is pushed against the action of the spring until it assumes the position shown in Fig. 2, wherein the shouldered portion or bead 36 engages the end of the housing and leaves the operating sleeve for the chuck completely exposed.

Preferably, the sleeve can be locked in retracted position by forming the slots on the inner surface of the housing with side notches 37, as is shown in Figs. 3 and 7, into which the keys 33 can be rotated. The surface of the bead can be roughened, as shown in Figs. 4 and 5, to aid in turning the sleeve. This relieves the user of the necessity of holding the sleeve against the action of the spring and frees both hands for operating the chuck.

In power-operated tools of the type described, in which an electric motor is used to drive the chuck, difficulties have been encountered when endeavoring to actuate the chuck-operating means to either tighten the grip on the shank of the tool or to release said grip. These difficulties result from the chuck being carried by the motor shaft connected to the rotor or armature of the motor which is free to rotate, and thus could not be readily held while the operating member was turned.

A feature of the present invention, however, is the provision of means for locking the chuck against rotation as by interlocking it with the motor casing when it is desired to actuate the chuck-operating means.

While this may be achieved in many ways, in the preferred form of the invention the chuck sleeve 15 is provided with a plurality of projecting teeth 38 closely spaced therearound, as shown in Fig. 3. The bushing 32 carried by the projecting sleeve is provided with a plurality of recesses 39 spaced to receive the teeth 38 when the sleeve 30 is moved to retracted position. The teeth 38 are so located on the clutch sleeve as to be engaged with the recesses 39.

Preferably, the teeth formed on the chuck sleeve are provided with an inclined surface 38a facing the bushing carried by the protecting sleeve, and the tooth portion 39a between the recesses of the bushing is curved, as shown in Fig. 8, so that the elements will automatically be guided into proper relationship upon the sleeve being moved into retracted position.

Thus, it will be seen that the moving of the sleeve into retracted position not only renders the chuck-operating means accessible for operation, but, at the same time, locks the chuck sleeve to the casing and against rotation.

With the protecting sleeve locked in retracted position, the chuck sleeve will be rigidly locked to the casing and the user can then hold the casing in one hand and turn the operating member for the chuck in either direction to cause the chuck to grip or release the shank of the tool as desired. The housing and operating member for the chuck can be provided with knurling or suitably roughened surfaces, as indicated in Figs. 4 and 5, at 31b and 23a, to aid in turning these elements.

Variations and modifications may be made within the scope of this invention and portions of the improvements may be used without others.

I claim:

1. In a power-operated hand tool, a casing having a power shaft extending therefrom; a chuck connected to the end of the shaft for securing a tool thereto for rotation therewith; a sleeve slidably carried by the casing; and means for urging said sleeve into a projected position in which the sleeve surrounds the chuck, said sleeve having a key and slot connection with said casing to hold the sleeve against rotation and being retractable against the action of the urging means to afford access to the chuck for operating the same to release or grip the tool.

2. In a power-operated hand tool, a casing having a power shaft extending therefrom; a chuck carried by the end of the shaft for securing a tool thereto for rotation therewith; a sleeve slidably carried by the casing; means for urging said sleeve into a projected position in which the sleeve surrounds the chuck, said sleeve being retractable against the action of the urging means to afford access to the chuck for operating the same to release or grip the tool; and means for locking said sleeve in retracted position.

3. In a power-operated tool, a casing having a power shaft extending therefrom; a housing secured to the casing and surrounding said shaft; a chuck having an operator therefor secured to said shaft for attaching a tool thereto for rotation therewith; a protecting sleeve slidable in said housing; means for resiliently projecting and holding said sleeve in projected position in which it surrounds said chuck and operator therefor; and means for positively holding said sleeve against relative rotation with respect to the housing while in projected position.

4. In a power-operated hand tool, a casing having a freely rotated power shaft extending therefrom; a chuck connected to said shaft; an operator for the chuck adapted to cause said chuck to grip or release a tool and connect the same for rotation with said shaft; a sleeve slidably carried by the casing; means for yieldingly moving said sleeve; means to limit the movement of the sleeve in a predetermined position to surround said chuck and provide a finger grip for the device adjacent the tool, said sleeve being retractable against the action of the moving means to expose said chuck operator; and means rendered operative by the movement of the sleeve to retracted position for locking said shaft against rotation.

5. In a power-operated hand tool, casing having a freely rotated power shaft extending therefrom; a chuck connected to said shaft; an operator for the chuck adapted to cause said chuck to grip or release a tool and connect the same for rotation with said shaft; a sleeve slidably carried by the casing; means for yieldingly urging said sleeve into a position to surround said chuck, said sleeve being retractable against the action of the urging means to expose said chuck operator; means rendered operative by the movement of the sleeve to retracted position for locking said shaft against rotation; and means for holding said sleeve in retracted position against the action of said urging means whereby the user has both hands free to operate the chuck to grip or release said tool.

6. In a device of the type described, a casing having a power shaft extending therefrom; a chuck and operator therefor secured to the shaft; a housing threaded to said casing; a protecting sleeve slidably mounted in said housing; a spring seating on said casing and normally urging said sleeve outwardly; means for limiting the outward movement of the sleeve by the spring in a position in which it surrounds said chuck so as to provide a grip for the device adjacent the tool and protect the user against the rotating chuck, said spring permitting said sleeve to be retracted to a position in which the chuck and operator therefor are exposed; means for holding said sleeve against rotation with respect to said housing; and means carried by said chuck and said sleeve and interlocking when said sleeve is in retracted position for holding said chuck and power shaft against rotation with respect to the chuck operator, sleeve and housing.

7. In a device of the type described, a casing having a power shaft extending therefrom; a chuck secured to the shaft; an operator for said chuck secured to the same; a protecting sleeve slidably mounted in said casing; a spring seating on said casing and sleeving said chuck for normally urging said sleeve into a position in which it surrounds said chuck and provides a grip for the device adjacent the chuck and protects the user against the rotating chuck, said spring permitting said sleeve to be retracted to a position in which the chuck and operator therefor are exposed; means operative in both positions of the sleeve for holding the same against rotation with respect to the casing; and means interlocking with the sleeve when the latter is in its retracted position for locking the chuck to said sleeve so that the operator may be actuated to open or close the chuck.

8. In a device of the type described, a casing having a power shaft extending therefrom; a chuck and an operator therefor secured to the shaft; a housing removably attached to the end of the casing; a sleeve slidably mounted in said housing; a spring within said housing acting against the inner end of said sleeve for normally moving said sleeve outwardly of the housing; means for limiting said movement of said sleeve in a position in which the outer end thereof surrounds said chuck so as to provide a finger grip for the device adjacent the chuck, the spring being tensioned and holding the sleeve in its limited position and permitting said sleeve to be retracted to a position in which the chuck and operator therefor are exposed; means for holding the sleeve against rotation with respect to the casing; and means interlocking with said sleeve when into the retracted position for locking the chuck to said sleeve.

9. In a device of the type described, a casing having a power shaft extending therefrom; a chuck and operator therefor secured to the shaft; a housing removably attached to the end of the casing; a protecting sleeve slidably mounted in said housing; a bushing fixed to the inner end of said sleeve; means acting against said bushing for normally urging said sleeve into a position in which it surrounds said chuck so as to provide a grip for the device adjacent the tool and protect the user against the rotating chuck, said sleeve being retractable to a position in which the chuck and operator therefor are exposed; means carried by said bushing for holding said sleeve against rotation with respect to said housing; and means carried by said chuck and said bushing and interlocking when said sleeve is in retracted position for holding said chuck and power-operated shaft against rotation with respect to the sleeve and housing, said last-named means being provided with means for guiding the elements thereof into interlocked relation upon movement of the sleeve to retracted position.

10. In a power-operated hand tool, a casing having a power shaft extending therefrom; a chuck connected to the power shaft for securing a tool to be driven thereby; a sleeve carried by the casing and normally surrounding the chuck to prevent casual personal engagement therewith, said sleeve being slidably mounted for movement away from normal position into chuck-exposing position to give access to the chuck; means for resiliently projecting and holding the sleeve in projected chuck surrounding position against casual retraction; and means for holding said sleeve against rotation with respect to the casing while in projected position.

11. In a power-operated tool, a casing having a freely rotatable power shaft extending therefrom; a chuck having an operator therefor secured to the shaft for rotation therewith; a sleeve carried by the casing and normally surrounding the chuck to prevent casual personal engagement therewith, said sleeve being slidably mounted for movement away from normal position into chuck-exposing position to give access to the chuck; means for resiliently projecting and holding the sleeve against casual retraction; means for limiting movement of said projected sleeve to chuck-surrounding position; and means, for locking said shaft against rotation, rendered operable by the movement of said sleeve against the action of said yielding means to a position in which the chuck operator is accessible.

12. A power-operated hand tool having a casing, a freely rotatable shaft therein, a shaft locking member movable on the casing and having means thereon for engaging with cooperating means on the shaft to lock said shaft against rotation with respect to the casing, said member being normally urged to inoperative position, and means interposed between the casing and locking member and operable by further movement of said member when the locking member is moved to operative position to hold said member in said position against the action of the urging means.

JOSEPH H. COHEN.

CERTIFICATE OF CORRECTION.

Patent No. 2,341,529.  February 15, 1944.

JOSEPH H. COHEN.

It is hereby certified that error appears in the printed specification of the above numbered patent requiring correction as follows: Page 1, first column, line 31, for "project" read --protect--; line 52, for "protection" read --protecting--; and second column, line 9, for "toll" read --tool--; page 3, first column, line 71, before "casing" insert --a--; and that the said Letters Patent should be read with this correction therein that the same may conform to the record of the case in the Patent Office.

Signed and sealed this 16th day of May, A. D. 1944.

Leslie Frazer (Seal)  Acting Commissioner of Patents.